United States Patent
Narra et al.

(10) Patent No.: US 12,183,306 B2
(45) Date of Patent: Dec. 31, 2024

(54) METHOD AND SYSTEM FOR CONTROLLING AND SYNCHRONIZING THE DISPLAY OF CONTENT ON MULTIPLE GAMING MACHINES AND/OR EXTERNAL DISPLAYS

(71) Applicant: AGS LLC, Las Vegas, NV (US)

(72) Inventors: Anil Kumar Narra, Alpharetta, GA (US); Padma Kumari Bhimavarapu, Suwanee, GA (US); Jose Mendoza Franco, Gainesville, GA (US); Jasonlee Kissee Hohman, Sparks, NV (US); Pradeep Jayaraman, Suwanee, GA (US); Jacob Kent Jennings, Duluth, GA (US); Journey Rose Jennings, Doraville, GA (US); Richard J. LaBrocca, Jackson, NJ (US); Sigmund Hyunjai Lee, Atlanta, GA (US); Cheng Li, Suwanee, GA (US); John Thomas Rule, Lawrenceville, GA (US); Cesar Alexander Sala, Sandy Springs, GA (US); Craig Michael Selby, Flowery Branch, GA (US); Jared Sheets, Kennesaw, GA (US); Tan Minh Tran, Tucker, GA (US)

(73) Assignee: AGS LLC, Las Vegas, NV (US)

( * ) Notice: Subject to any disclaimer, the term of this patent is extended or adjusted under 35 U.S.C. 154(b) by 0 days.

(21) Appl. No.: 17/987,634

(22) Filed: Nov. 15, 2022

(65) Prior Publication Data

US 2024/0161716 A1    May 16, 2024

(51) Int. Cl.
*G09G 5/12*    (2006.01)
*G06F 3/0486*   (2013.01)
*G07F 17/32*    (2006.01)

(52) U.S. Cl.
CPC ............. *G09G 5/12* (2013.01); *G06F 3/0486* (2013.01); *G07F 17/3211* (2013.01); *G07F 17/3258* (2013.01); *G09G 2370/042* (2013.01)

(58) Field of Classification Search
CPC .. G09G 5/12; G09G 2370/042; G06F 3/0486; G07F 17/3211; G07F 17/3258
See application file for complete search history.

(56) References Cited

U.S. PATENT DOCUMENTS

| 7,008,324 B1 | 3/2006 | Johnson et al. |
| 9,092,930 B2 | 7/2015 | Cuddy et al. |

(Continued)

*Primary Examiner* — Ibrahim A Khan
(74) *Attorney, Agent, or Firm* — WEIDE & MILLER, LTD.

(57) ABSTRACT

Systems and methods permit or cause content to be displayed by a plurality of gaming displays, such as gaming machine displays and/or external displays. Content may be synchronously displayed by multiple gaming displays, such as one or more EGM displays and one or more external gaming displays, where the content which is displayed by the different displays may be the same or be different, and may be provided by a content controller and/or may be provided or triggered by a gaming machine. The systems and methods permit or cause content to be synchronously displayed across multiple gaming displays, such as in time and/or space. In some examples, the content is configured as a content "package" which is associated with one or more displays.

20 Claims, 12 Drawing Sheets

(56) References Cited

U.S. PATENT DOCUMENTS

| | | | |
|---|---|---|---|
| 9,997,010 B2 | 6/2018 | Lee | |
| 11,816,950 B2* | 11/2023 | Urban | G07F 17/3209 |
| 2006/0048062 A1* | 3/2006 | Adamson | G09G 5/363 |
| | | | 715/810 |
| 2009/0156303 A1* | 6/2009 | Kiely | G07F 17/3223 |
| | | | 463/29 |
| 2009/0179597 A1 | 7/2009 | Salmon | |
| 2011/0070940 A1 | 3/2011 | Jaffe et al. | |
| 2011/0159940 A1* | 6/2011 | Acres | G07F 17/32 |
| | | | 463/20 |
| 2012/0066624 A1* | 3/2012 | Kwak | G06F 3/0481 |
| | | | 715/765 |
| 2012/0083331 A1* | 4/2012 | Carpenter | G07F 17/3244 |
| | | | 463/25 |
| 2012/0129601 A1 | 5/2012 | Gronkowski et al. | |
| 2012/0220363 A1 | 8/2012 | Bytnar et al. | |
| 2013/0178523 A1 | 7/2013 | Robertson et al. | |
| 2013/0225270 A1* | 8/2013 | Kelly | G07F 17/3267 |
| | | | 463/25 |
| 2014/0087887 A1 | 3/2014 | Chudek | |
| 2014/0206432 A1 | 7/2014 | Radek et al. | |
| 2014/0329592 A1* | 11/2014 | Thompson | G07F 17/3211 |
| | | | 463/31 |
| 2015/0141113 A1* | 5/2015 | Melnick | G07F 17/3202 |
| | | | 463/20 |
| 2016/0085417 A1* | 3/2016 | Stauber | G06F 9/452 |
| | | | 715/788 |
| 2016/0203579 A1* | 7/2016 | Griffin | G09G 5/006 |
| | | | 345/520 |
| 2016/0316259 A1* | 10/2016 | Kambhatla | H04N 21/44227 |
| 2016/0343202 A1* | 11/2016 | Fujisawa | G07F 17/3269 |
| 2017/0068502 A1* | 3/2017 | Seo | G06F 3/1446 |
| 2017/0134690 A1* | 5/2017 | Masumoto | G06F 3/1438 |
| 2018/0357981 A1* | 12/2018 | Ng | G06Q 30/0269 |
| 2019/0102134 A1* | 4/2019 | Chen | H04N 9/3179 |
| 2021/0064402 A1* | 3/2021 | Jenks | G06F 3/1446 |
| 2021/0210051 A1* | 7/2021 | Wang | G06K 17/00 |
| 2021/0304559 A1* | 9/2021 | Cupersmith | H04W 4/025 |
| 2021/0312881 A1* | 10/2021 | Kamekura | G06F 3/04162 |
| 2022/0147098 A1* | 5/2022 | Stewart | G06F 1/1677 |
| 2022/0391158 A1* | 12/2022 | Lemmens | G06F 3/1438 |

* cited by examiner

METHOD AND SYSTEM FOR CONTROLLING AND SYNCHRONIZING THE DISPLAY OF CONTENT ON MULTIPLE GAMING MACHINES AND/OR EXTERNAL DISPLAYS

FIELD OF THE INVENTION

The present invention relates to methods and systems for controlling the display of content on multiple displays, such as the displays of electronic gaming machines and/or associated external display devices.

BACKGROUND OF THE INVENTION

Traditional wagering-type gaming machines having associated video displays, such as main displays or top boxes, are configured so that the controller of the gaming machine controls the content displayed on the associated displays. In this configuration, each gaming machine displays content independently of other gaming machines, both in terms of content and timing. Even if two gaming machines are configured to present the same content (such as because they present the same game and are configured to present attraction content on a top box thereof), the content would be displayed at different times by the two machines. In a casino environment where multiple gaming machines are located in proximity to one another, this results in a chaotic presentation of content to players, even as to similar gaming machines (such as presenting the same game) or proximate gaming machines (such as gaming machines located next to one another).

Some attempts have been made to synchronize generated effects of multiple gaming machines. For example, U.S. Pub. No. 2012/0178523 to Greenberg discloses gaming machines having emotive lighting, such as a ring of lights at the exterior of the housing. These lights may be illuminated in various manners or patterns, such as to create various lighting effects. Moreover, a single external controller may be utilized to synchronously control the emotive lighting of multiple gaming machines, such as to generate unique effects from the combination of lights of two or more machines. This does not change, however, that the video displays of or associated with the gaming machines are still not configured to display content in a unified fashion.

In fact, there are a number of problems associated with attempting to control the content displayed by the video displays of multiple gaming machines and/or external displays. For example, differences in screen resolution, screen size, frame rate or other properties or characteristics between the displays of the gaming machines and/or external displays may pose problems when one tries to display the same content at the different displays. This problem is enhanced when it is desired that the two machines display a unified image, particularly when characteristics of the displays, as well as their locations, may vary. Even if content can be synchronized manually between two displays, such as by custom configuring the setup of the devices based upon specific knowledge of the devices (frame rate, size, resolution, etc.) and location, that solution does not work in an environment where the location of the devices may change, or where it is desired to change the content or the grouping of displays that are to display content.

A system and method for controlling the display of content on multiple displays, such as the displays of electronic gaming machines ("EGMs") and/or external display devices (collectively "gaming displays"), such as to synchronize content displayed thereby, is desired.

SUMMARY OF THE INVENTION

Aspects of the invention comprises systems, devices and methods for generating and controlling the display of content on multiple gaming displays comprising gaming machine displays or electronic gaming device displays and/or associated external displays.

In some examples, content may be synchronously displayed by multiple gaming displays, such as one or more EGM displays and one or more external gaming displays, where the content which is displayed by the different displays may be the same or be different, and may be provided by a content controller and/or may be provided or triggered by a gaming machine. In some examples, the systems and methods permit or cause content to be synchronously displayed across multiple gaming displays, such as in time and/or space. In some examples, the content is configured as a content "package" which is associated with one or more displays.

One aspect of the invention is a system for displaying content on two or more gaming displays comprising a database comprising a plurality of content packages and a synchronization controller, a memory, machine-readable code stored in the memory and executable by the controller to: receive a first identification associated with a first gaming display and a second identification associated with a second gaming display; determine a first set of video display properties of the first gaming display and a second set of video display properties of with the second gaming display; receive input regarding at least one of an orientation and location of the first and second gaming displays; associate at least a first one of the plurality of content packages with the first gaming display and at least a second one of the plurality of content packages with the second gaming display; generating a first content configuration for the at least first one of the plurality of content packages for the first gaming display based at least in part upon the first set of video display properties thereof and a second content configuration for the at least second one of the plurality of content packages for the second gaming display based at least in part upon the second set of video display properties thereof; and causing the first video display to present first video content based upon the first content configuration and the second video display to present second video content based upon the second content configuration.

Another aspect of the invention is a method of dynamically generating and synchronizing content displayed on a first gaming display of a first gaming machine and a second gaming display of a second gaming machine, comprising the steps of: receiving, at the first gaming machine, a first content package and storing the content package in a memory associated with the first gaming machine; receiving, at the second gaming machine, the first content package and storing the content package in the memory associated with the second gaming machine; designating the first gaming machine as a director and the second gaming machine as an actor; causing, via a controller of the first gaming machine, first content to be displayed at the first gaming display based upon processing of the first content package; and causing, via a controller of the second gaming machine, second content to be displayed at the second gaming display based upon processing of the first content package; wherein the second content is synchronized with the first content in at least one of time and space.

Yet another aspect of the invention comprises a gaming system comprising: a first gaming machine comprising a processor, a memory, a first video display and a first content package for use in presenting first content on the first video display; at least one second gaming machine comprising a processor, a memory, a second video display and a second content package for use in presenting second video content on the second video display; and at least one load balancer comprising a processor, a memory, machine-readable code stored in the memory and executable by the processor, and a communication port, the load balancer configured to receive information regarding a processing load of the processor of the first gaming machine and a processing load of the processor of the second gaming machine and cause the second gaming machine to process the first content package and transmit processed first content package information to the first gaming machine for display by the first video display Further objects, features, and advantages of the present invention over the prior art will become apparent from the detailed description of the drawings which follows, when considered with the attached figures.

DETAILED DESCRIPTION OF THE INVENTION

Figure 1:
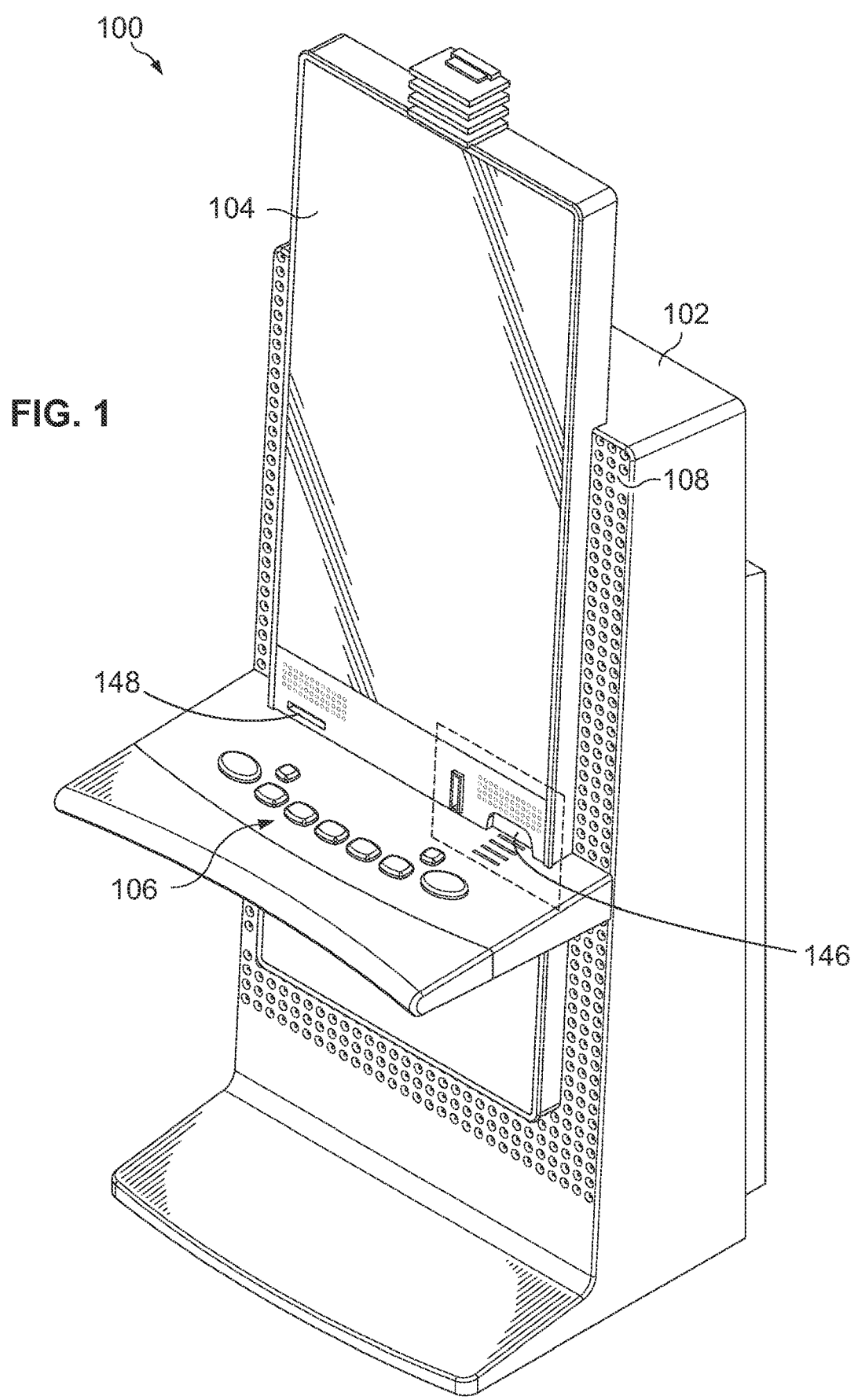
FIG. 1 illustrates one example of a gaming machine which may be configured to display content in accordance with the invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises systems, devices and methods for generating and controlling the display of content on multiple displays comprising gaming machine or electronic gaming device displays ("EGM display(s)") and/or associated external displays ("external gaming displays") (collectively, "gaming displays"). The EGM displays may comprise one or more displays which are associated with a particular gaming machine or device, such as mounted to or supported thereby (such as by connection to a housing, door, or other support of the electronic gaming machine ("EGM")), including one or more main displays, top box displays or the like. The external gaming displays may comprise, for example, progressive displays, bank displays or other displays which may be located proximate to one or more gaming machines. The invention has particular utility to EGMs which are configured to present wagering games and/or are located in casino environments.

In some examples, the systems and methods permit or cause content to be synchronously displayed by one or more gaming machines and one or more external displays. In some examples, content may be synchronously displayed by multiple gaming displays, such as one or more EGM displays and one or more external gaming displays (such as the displays of EGMs at a bank and the associated external gaming displays at the bank). The content which is displayed by the different displays may be the same or be different, and may be provided by a content controller and/or may be provided or triggered by an EGM.

In some examples, the systems and methods permit or cause content to be synchronously displayed across multiple gaming displays, such as the displays of two or more EGMs. In such a configuration, portions of content are displayed by different ones of the displays.

In some examples, the content is configured as a content "package" which is associated with one or more displays. As one example, a content package might comprise a game content package for a display of an EGM and might comprise a jackpot content package for an external bank display, which jackpot package includes associated jackpot information (such as progressive jackpot information where the value of the jackpot may change over time, thus necessitating an update to the displayed content in order to display the latest jackpot values).

In one example of the invention, properties of gaming displays may be automatically determined or detected and that property information may be used in configuration the presentation of the content.

In another example of the invention, the position of the displays is utilized in presenting the content. In one example, a user provides input regarding the positions (location/orientation) of the displays. In another example, the position information may be automatically detected or determined.

In other examples of the invention, an EGM may generate content which is displayed by the displays of associated EGMs or external displays. In another example, external content may be presented over base content on an external display. In another example, content may be dynamically created and distributed across gaming displays in a network.

FIG. 1 illustrates one example of an EGM 100 which may be configured to display content in accordance with the invention.

In this example, the EGM 100 defines a generally enclosed interior space for housing one or more components. As illustrated, the EGM 100 generally comprises a housing or cabinet 102 for supporting and/or enclosing various components required for operation of the EGM. The housing 102 may include one or more doors, panels or the like, capable of being moved between an open position which allows access to the interior, and a closed position in which access to the interior is generally prevented. The configuration of the EGM 100 may vary. In the example illustrated, the EGM 100 generally has an "upright" configuration. However, the EGM 100 could have other configurations, shapes or dimensions, such as being of a "slant"-type, "bar-top" or other configurations known to those of skill in the art.

The EGM 100 preferably includes at least one display device 104 configured to display information or content, such as game information and synchronized special content as described herein. The display device 104 may be a mechanical, electro-mechanical or electronic display, such as one or more rotating reels, a video display or the like. When the display device 104 is an electronic video display, it may comprise a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 104 may be capable of projecting or displaying a wide variety of information, including images, symbols and other indicia or information associated with game play, game promotion or other events. As detailed below, the EGM 100 may include one or more second or secondary display devices. Such might be associated with the housing or cabinet 102 with the main display device 104, or be associated with a top box or the like.

The EGM 100 includes one or more player input devices 106 (such as input buttons, plunger mechanisms, a touch-screen display, joystick, touch-pad or the like). These one or more devices 106 may be utilized by the player to facilitate game play, such as by providing input or instruction to the EGM 100. For example, such input devices 106 may be utilized by a player to place a wager, cause the EGM 100 to initiate a game, to initiate a reel spin, to "cash out" of the gaming machine, or to provide various other inputs.

Figure 2:
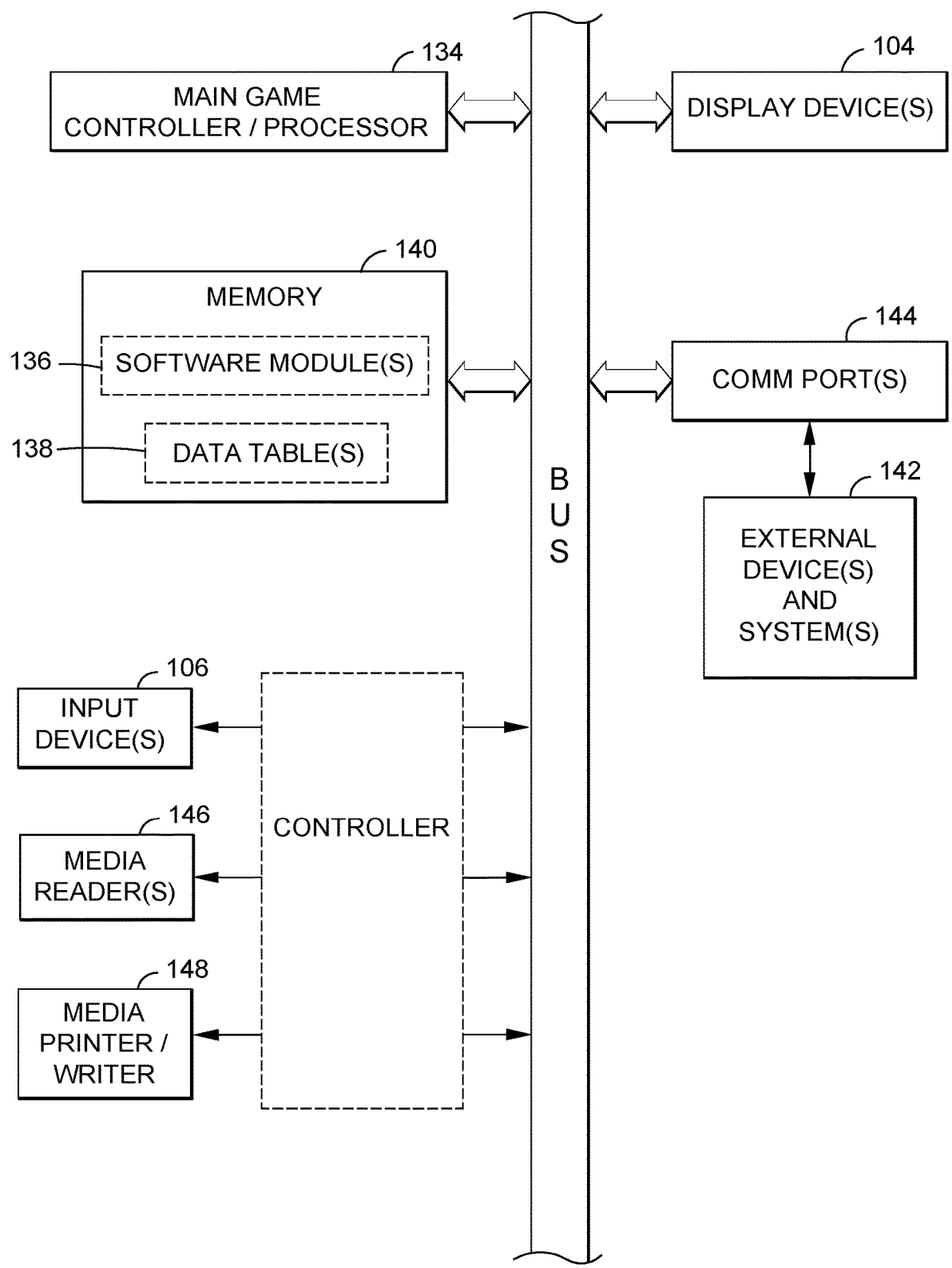
FIG. 2 illustrates aspects of the gaming machine illustrated in FIG. 1.

Referring to FIG. 2, in one preferred example, the EGM 100 includes at least one microprocessor or controller 134 for controlling the gaming machine, including receiving player input and sending output signals for controlling the various components or peripheral devices of the EGM 100 (such as generating game information for display by the display device 104). The controller 134 may be arranged to receive information regarding funds provided by a player to the EGM 100, receive input such as a purchase/bet signal when a purchase/bet button is depressed, and receive other inputs from a player. The controller may be arranged to generate information regarding a game, such as generating game information for display by the at least one display device 104, for determining winning or losing game outcomes and for displaying information regarding awards for winning game outcomes, among other things.

The controller 134 may be configured to execute machine readable code or "software" or otherwise process information, such as obtained from a remote server. Software 136 or other instructions may be stored at a memory or data storage device 140, e.g. in a fixed or non-transitory configuration. The memory may also store other information or data 140, such as data stored in table or other forms (including, but not limited to look-up tables, pay tables and other information including tracked game play information). The EGM 100 may also include one or more random number generators for generating random numbers (such as implemented by a random number generator software module stored in the memory 140 and executable by the processor 134), such as for use in selecting slot symbols, multiplier values, cards or other game elements and for presenting the game in a random fashion (e.g. whereby the game is presented in a manner in which the player cannot control the outcome) or pseudo-random fashion (e.g. such as where the game includes a skill component which can affect the outcome of the game).

The controller 134 is configured to execute machine readable code or instructions (e.g. software) which are configured to implement the game. In this regard, the EGM 100 may be specially configured to present the game of the invention via specific software and/or hardware which causes the gaming machine to operate uniquely. For example, the controller 134 of the EGM 100 may be configured to detect a wager, such as a signal from a player's depressing of the "bet one" button. Upon such an event and/or the player otherwise signaling the gaming machine to present the game, the controller may be configured to cause the at least one display 104 to display unique information, such as a unique graphical interface or unique game display, including game symbols or other game information. The controller may accept input from a player of game inputs, such as a request to spin reels or the like, via the one or more player input devices 106 of the EGM 100. As indicated above, the machine readable code may be configured in various manners, such as by having various "modules" of software which are designed to implement specific features of the game play or game presentation.

The EGM 100 may be configured to generate and present games in a stand-alone manner or it may be in communication with one or more external devices or systems 142 at one or more times. The EGM 100 might communicate with one or more of such external devices or systems 142 via one or more communication ports 44 or other interface devices. These ports or interface devices 144 may be configured to implement various communication protocols (including proprietary protocols) and communicate via wireless, wired or other communication link. For example, the EGM 100 may be configured as a server based device and obtain game code or game outcome information from a remote game server (in which event the gaming machine controller may receive game information from the server, such as game outcome information, and use that server-generated information to present the game at the gaming machine).

As indicated, in one example, the EGM 100 is configured to present one or more wagering games. The EGM 100 is configured to accept value, such as in the form of coins, tokens, paper currency or other elements or devices representing value such as monetary funds. Thus, as indicated above, the EGM 100 preferably includes a mechanism or means for accepting monetary value. For example, the EGM 100 might include a coin acceptor for accepting coins. Of course, associated coin reading/verifying devices and coin storage devices may be associated with the EGM 100 if it is configured to accept coins. Likewise, as illustrated in FIGS. 1 and 2, the EGM 100 might include a media reader 146. Such a reader may be configured to accept and read/verify paper currency and/or other media such as tickets. Of course, in such event the EGM 100 may further be configured with one or more paper currency or ticket storage devices, such as cash boxes, and other paper currency or media handling devices (including transport devices).

The EGM 100 might also be configured to read FOB s, magnetic stripe cards or other media having data associated therewith and via which value or funds may be associated with the EGM 100. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications, such as to enable the transfer of funds from the player to the gaming machine or system.

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one example, when the player's wager is received, the player's credit balance is reduced by the number of wagered credits. The player might then provide a separate input to begin the game. In other example, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one example, the EGM 100 is configured to award winnings for one or more winning wagering game outcomes. Such winnings may be represented as credits, points or the like. In one example, the player may "cash out" and thus remove previously associated funds and any awarded winnings or such may otherwise be paid to the player. These winnings may be associated with the player's credit balance, thus increasing the player's credit balance.

In one example, the player may provide an input to the EGM 100 to indicate their desire to cash out, such as by selecting a "cash out" button or touch screen feature or providing other input. In response, a monetary value represented by the player's credit balance or the like is preferably paid, transferred or otherwise provided to the player. For example, upon an award or at cash-out, associated funds may be paid to the player by the EGM 100 dispensing coins to a coin tray. In another example, funds may be issued by dispensing paper currency or other media. In yet another example, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference. In yet another example, the cash-out might result in the dispensing of a card or other media which stores or represents the cashed-out funds, such as by writing funds information to a magnetic stripe of a card which is inserted into a media writer of the gaming machine or dispensed from the machine. In this regard, the EGM 100 may include one or more media printers or writers 148. In other examples, the cash-out mechanism may result in the funds value being transferred to an external device or account, such as a player's casino account (such as associated with a casino server), a remote bank or other financial account, or an electronic device such as a player's phone, PDA or tablet.

The EGM 100 may also include a player tracking device, such as a card reader and/or an associated keypad or other input device (such as a touch screen display). Such player tracking devices are well known and may permit the game operator to track play of players of the gaming machine. The tracked play may be utilized to offer player bonuses or awards.

As illustrated in FIG. 2, the main game controller or processor 134 may communicate with several of the peripheral devices via one or more intermediary controllers. For example, some of the peripheral devices might comprise USB type or enabled devices which are controlled by an intermediary USB controller.

The EGM 100 might have other features. For example, as illustrated, the EGM 100 might include one or more lighting features, such as one or more lights (such as LEDs, etc.) 108. The lights 108 might be associated with the housing 102 and might be arranged in various configurations, such as in rows and/or columns or in other patterns/arrangements. As illustrated, the lights 108 might be arranged in rows and columns around the display 104 and/or at various peripheral portions of a front of the housing 102.

The EGM 100 may also include one more audio devices, such an audio controller and one or more audio generating devices, such as speakers.

As indicated above, the EGM 100 may be configured as a stand-alone device. In other instances, however, the EGM 100 may be a server-based or networked machine. For example, the EGM 100 may be configured to obtain game code, game information or game outcome information from a remote server. The EGM 100 may also communicate with a remote accounting server and/or player tracking server, as is well known in the art.

Figure 3:
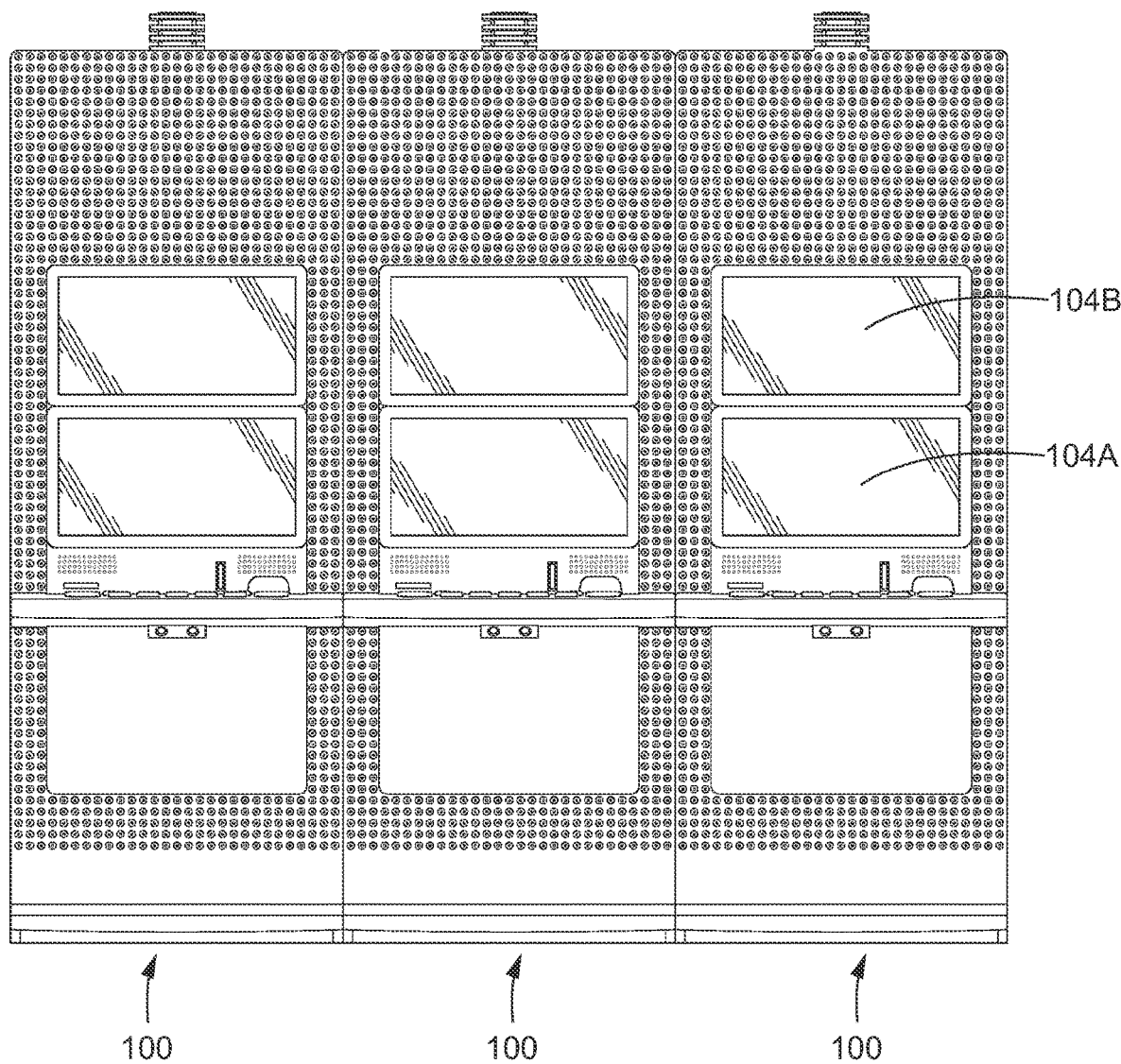
FIG. 3 illustrates an exemplary group of two or more gaming machines which may display synchronized content.

A casino may have numerous such EGMs 100, such as located on a casino floor or in other locations. Of course, such EGMs 100 might be used in other environments, such as an airport, a bar or tavern or other locations. The EGMs 100 might be arranged in various configurations in such an environment. For example, the EGMs 100 might be spaced from one another, or located in groups or "banks." As one example, as illustrated in FIG. 3, two or more EGMs 100 might be located next to one another, such as in a side-by-side and/or back-to-back (whether touching or spaced) configuration. FIG. 3 also shows an example where the EGMs 100 have two or more displays, such as a first display 104A and a second display 104B.

Figure 4:
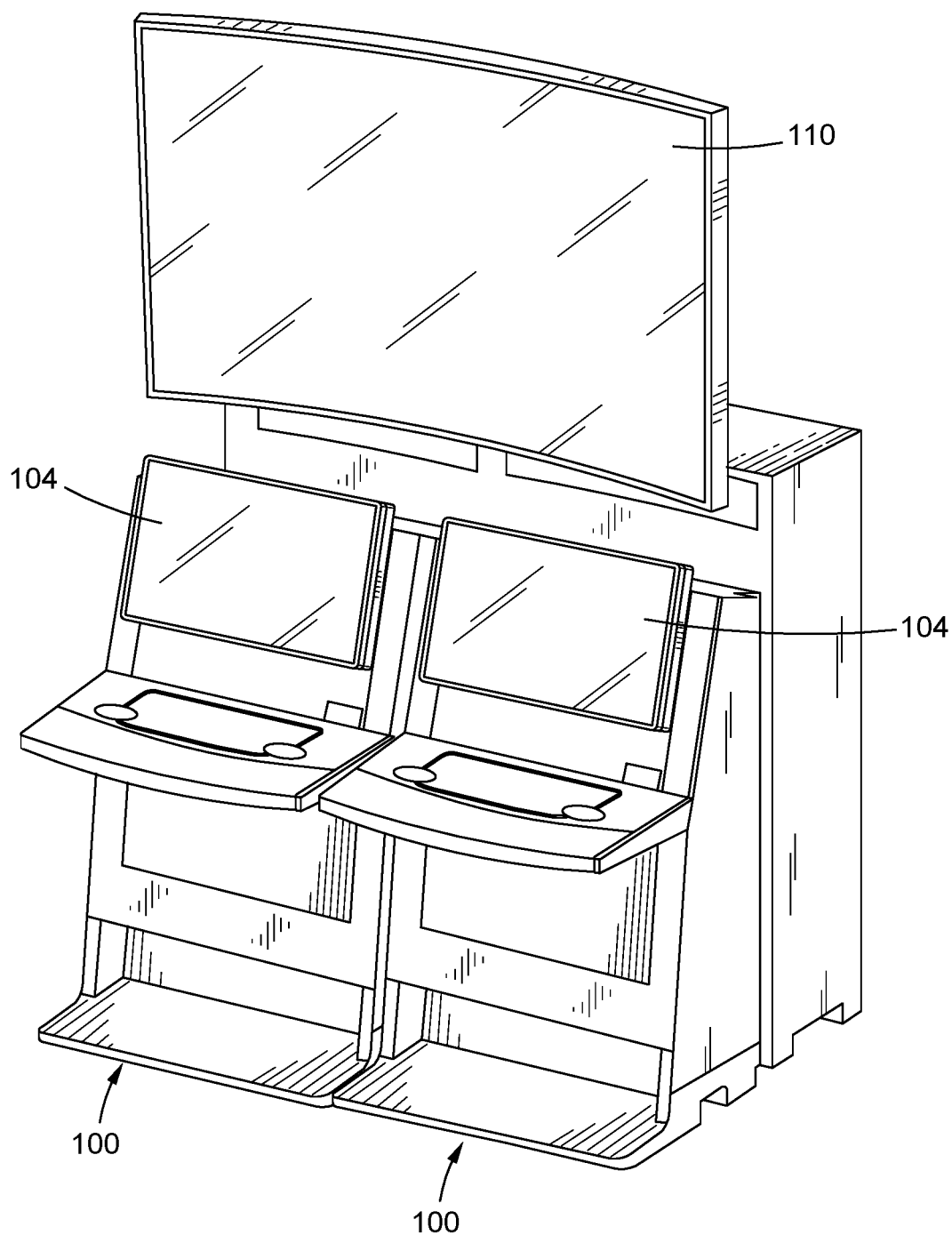
FIG. 4 illustrates an example of one or more gaming machines with at least one associated external gaming display in an example of the invention.

As indicated above, aspects of the invention also relate to external gaming displays. FIG. 4 illustrates an example of an external gaming display 110. FIG. 4 illustrates an exemplary configuration where an external gaming display 110 may be associated with or located proximate to, one or more EGMs 100. In this example, two EGMs 100, each having their own display 104, are located proximate to one another (in other examples, there might only be a single EGM or more than two EGMs). The external gaming display 110 is located proximate to those EGMs 100. The external gaming display 110 is illustrates as being supported by a stand which is associated with the EGMs 100, but the external gaming display 110 might be mounted to or supported by other elements or structures. The external gaming display 110 is, as illustrated, not directly part of either of the EGMs 100. Further, the shape, size and other characteristics of the external gaming display 110 might vary. Further, more than one external gaming display 110 might be provided. The external gaming display 110 may be, as described herein, controlled to cause it to display various information, such as information associated with the EGMs 100, or other information or content, such as jackpot information, advertising/attraction content, etc.

Figure 5:
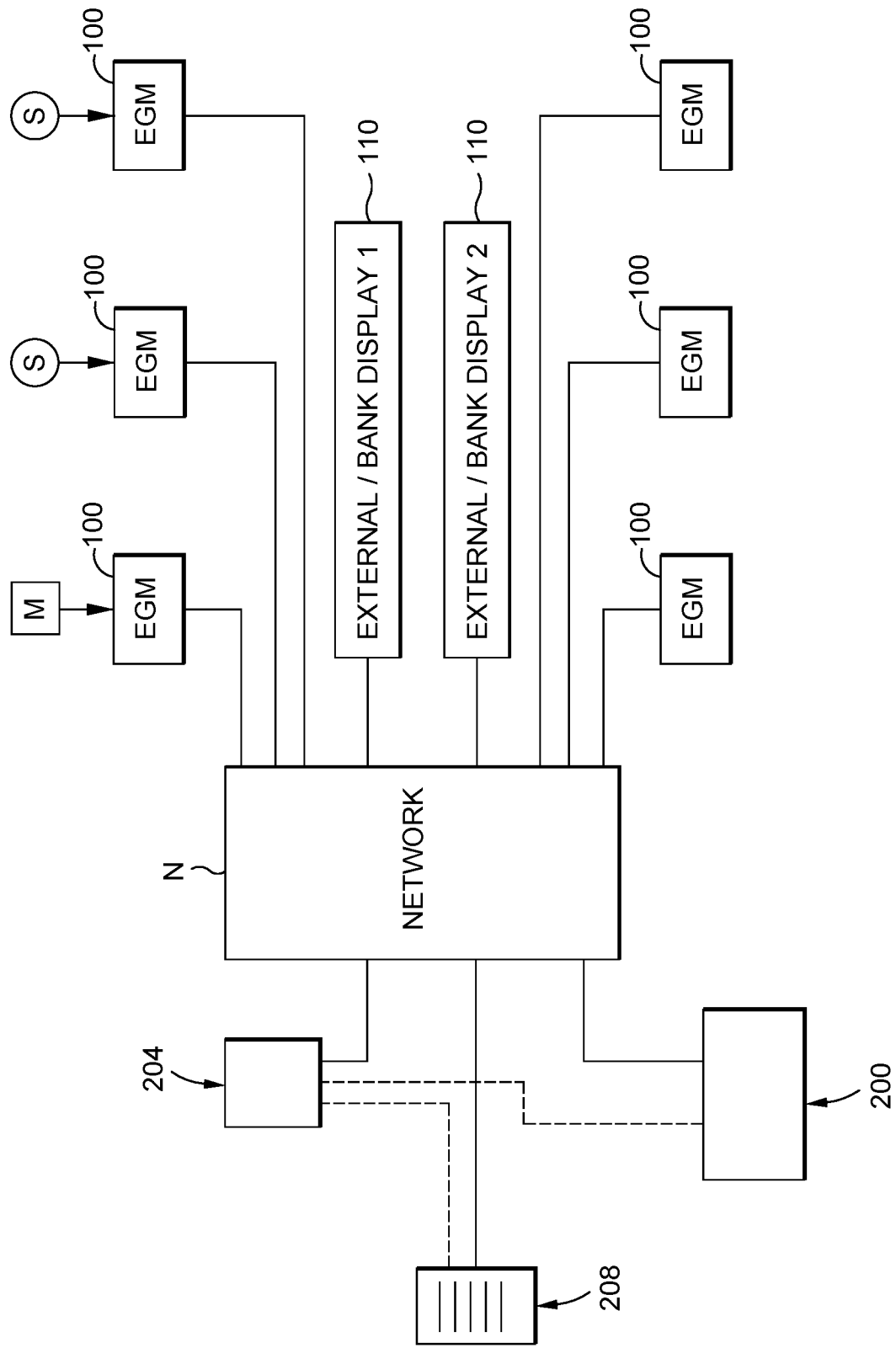
FIG. 5 illustrates an exemplary system of the invention.

FIG. 5 illustrates one example of a configuration of a system of the invention. In FIG. 5, one or more EGMs 100 may be communicatively coupled to a progressive controller 200. As is well known, the EGMs 100 may report information to the progressive controller 200, such as amounts wagered or the like, for use by the progressive controller 200 in generating progressive jackpot values. In the event a jackpot winning outcome is received, the EGM 100 at which the win occurred may report that win, the player may be awarded the jackpot at the EGM (which may be processed in various manners, including by collecting information from the player and hand-paying the jackpot to them) and the progressive controller 200 may then reset the jackpot back to a starting or seed value.

As indicated above, although not illustrated, the EGMs 100 may also be connected to additional systems or devices, such as an accounting system, a player loyalty system, etc. The accounting system may implement accounting functionality, which may include tracking of wagers made, winnings awarded/paid and amounts lost at the gaming devices at the casino (EGMs 100, tables, etc.), amounts associated with monetary value tickets issued and redeemed, etc. The player loyalty system may implement player tracking and rewards functionality, such as by generating and maintaining player accounts for individual players, tracking wagering and other activities of the players, and issuing awards to players based upon their activities, such as points or the like, awarding promotional awards, presenting promotional events (including promotional games), etc. The credit system may implement credit functionality, such as to accept credit applications for players, determine player credit-worthiness of players, generate credit lines for players, track amounts of credits issued to players, and implement collection efforts for unpaid amounts.

In accordance with an example of the invention, a content controller 204 is provided. In one example, the content controller 204 may comprise one or more processors or controllers, at least one communication device or interface, a database or other data storage device, and one or more additional memory or data storage devices (such as separate from the database). In one or more examples, the processor(s) is configured to execute one or more instructions, such as in the form of machine readable code (i.e. "software"), to allow the server to perform various functions. The software is preferably non-transitory, such as by being fixed in a tangible medium. For example, the software may be stored in the one or more memory devices. One or more of the memory devices may be read-only. In addition, the software may be stored on a removable medium in some examples. In general, the one or more memory devices are used as temporary storage. For example, the one or more memory devices may be random access memory or cache memory used to temporarily store some user information and/or instructions for execution by the at least one processor.

The content controller 204 may be communicatively coupled to one or more external devices or systems, such as an external server, a user work station or the like, whereby the processor may receive information from an operator or servicer of the content controller 204 and/or output information thereto. This allows, for example, an operator of the content controller 204 to interface with it to upgrade, maintain, monitor, etc., it.

The content controller 204 may communicate with one or more external gaming displays 110 (such as external/bank display 1 and external/bank display 2 illustrated in FIG. 5) and one or more EGMs 100, such as directly, or through a network N. In one example, the EGMs 100 may communicate with the progressive controller 200 via the content controller 204 (in other examples, the content controller 204 may communicate with the progressive controller 200 and the EGMs 100 may communicate with the progressive controller 200 via one or more separate communication paths, such as through the network N). In such a configuration, the progressive controller 200 may be configured to monitor jackpot wins at the EGMs 100 and transmit the occurrence of the progressive jackpot win to the content controller 204. The content controller 204 may then cause particular content to be displayed at the one of more displays (external or EGM displays).

In some examples, content may be provided by an external device, such as a server 208. The server 208 may comprise, for example, a processor, a memory, machine-readable code stored in the memory and configured to be executed by the processor to implement certain functionality. Data may be stored in the memory or an associated database. As one example, content packages might be generated at the server 208 and stored in the database thereof. These content packages may be provided to the content controller 204. In other examples, as detailed below, the server 208 might be used to create dynamic content which is delivered to a plurality of gaming displays.

Display/Synchronization of Content Between EGMs and External Gaming Displays

One example of the invention comprises using the content controller 204 to cause content to be displayed at: (i) one or more external displays 110, or (ii) the one or more external displays 110 and the one or more EGMs (the one or more displays 104 thereof). In some examples, the presentation of content may come from or be trigged by an EGM, whereby an EGM causes the display of content at one or more of the external displays 110.

Figure 6:
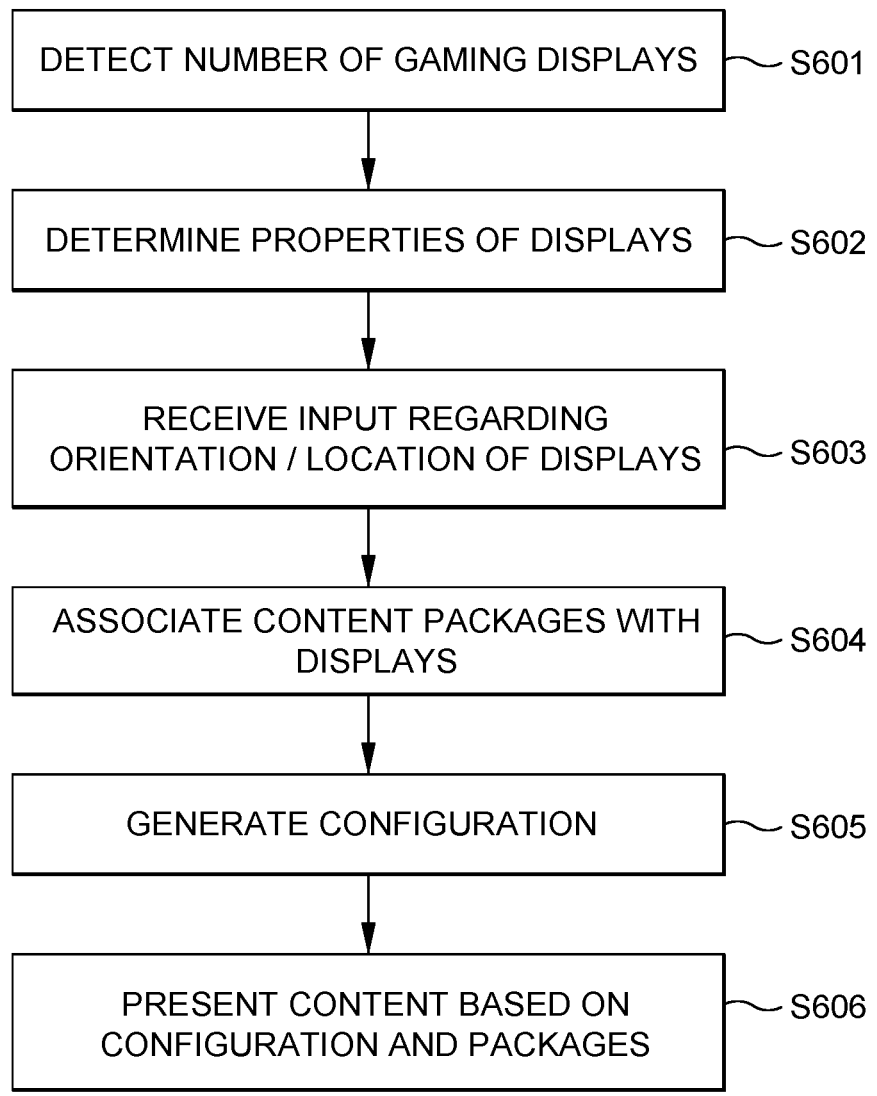
FIG. 6 is a flowchart illustrating a process in accordance with an example of the invention.

FIG. 6 is a flowchart illustrating a method of generating and presenting content in one example of the invention. In one example, the process of configurating the displays and associated content may be implemented or facilitated by software running on the content controller 204 (or on another device, such as the server 208), such as in a "configuration" mode, which mode may present a configuration graphical user interface to the user.

In a step S601, the content controller 204 may detect a number of gaming displays associated therewith. This may comprise one or more displays which are linked to the content controller 204, such as by being on the same network N, by specifically being associated with the content controller 204 for use by the content controller or otherwise.

Specifically, the content controller 204 may retrieve an identification (such as a display ID or machine ID) of each associated gaming display (such as by querying the display or EGM for identification information, such as the associated ID). In the case of an EGM having multiple displays, the content controller 204 may query the EGM 100 and receive information that the EGM has multiple displays and the display IDs therewith. In one example, the ID for a particular machine or display is static, even though the display may be configured to display different content and be associated with various combinations of other displays.

At a step S602, the properties of each connected gaming display are obtained. This information may comprise one or more of: a) display size (actual display dimensions and/or total display dimensions including bezel/frame); b) frame rate; c) refresh rate; d) resolution (such as in pixels, e.g. 640×480, 1280×720, etc.); and e) other information (for example, but not limited to, contrast, instability, etc.). The properties may be determined from a table of information for the display based upon a lookup using the ID of the display, or by querying the display.

Figure 7:
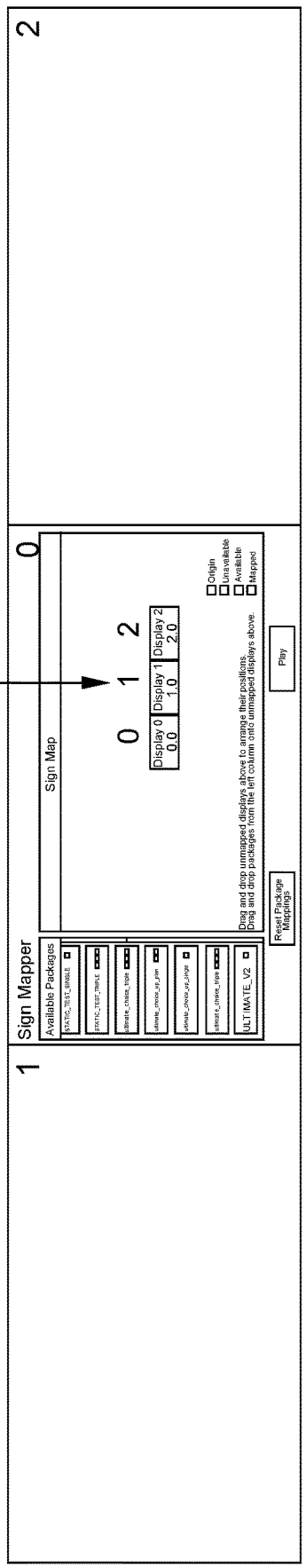
FIG. 7 illustrates example graphical user interfaces for implementing aspects of the invention.
Figure 7:
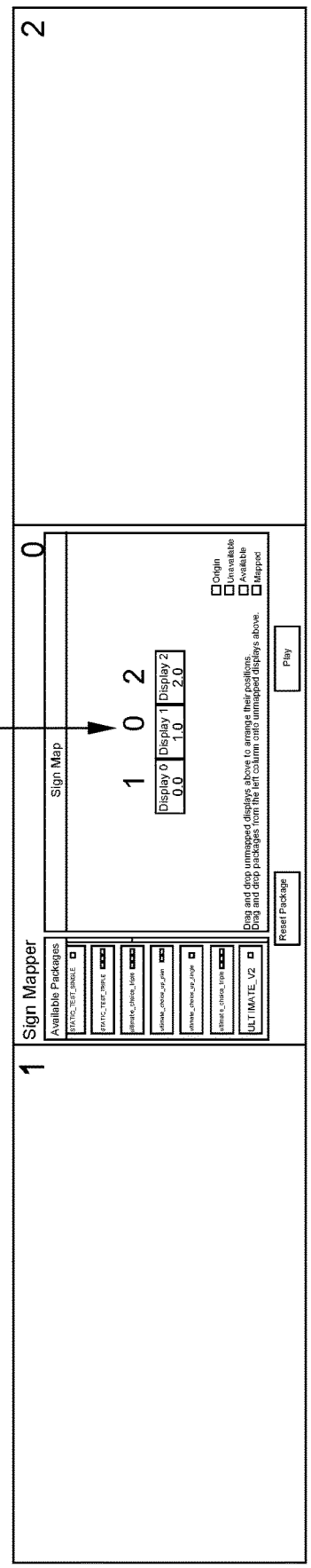

At a step S603, one or more of the identified gaming displays are arranged or associated with one another (the selected displays may be referred to as selected or designated displays of the one or more associated displays). In one example, this comprises receiving input from a user of one or more gaming displays from the identified gaming displays, and their orientation. In one example, input may be received via a graphical user interface which allows a user to select displays and move representations of the displays, such as illustrated in FIG. 7. As illustrated therein, in one example, one display may be required to be assigned an "anchor" position, such as (0,0). The user may then associate other displays, preferably by arranging them on the interface (such as by dropping and/or dragging representations thereof) in a manner which matches their physical/real world location. The location rendering may be modified, such as if the positions of one or more displays change (such as by being relocated within the casino).

In a step S604, content is associated with the one or more designated displays. In one example, as indicated above, "packages" of content may be associated with the content controller 204 (such as by being uploaded to a memory or database associated therewith). Content packages may have various characteristics, including comprising various types of content (images, video, etc.) and may have criteria, such as the type(s) of displays or EGM with which the content may be associated. For example, some content packages might only be usable with external gaming displays 110, while others might be usable with EGMs 100 (for display by the display(s) 104 thereof) or external gaming displays 110, and certain "game" content packages may only be used with certain EGMs 100. In one example, a visual indication may be provided to the user to indicate which displays a content package can be used with. For example, upon selecting a display, a list of available content packages may be provided (wherein content packages which cannot be used with that display are not shown or may be shown in a manner which visually distinguishes them from the packages which can be selected), thus aiding the user in selecting the correct packages for the displays.

In one example, step S604 may comprise receiving input from a user of one or more packages, such as a selection of one or more packages from a list or menu. In one example, a user might select or associate a single package for all of the designated displays. In another example, the user may select different packages for different displays. As one example, a user might select a package and drag it on the graphical user interface to one or more of the displays, thus associating a package with each designated display.

In a step S605, the content controller 204 may generate a content configuration for the displays. This may comprise, for example, configuring the designated content for display by the designated displays, including based upon information about the properties of the designated displays and their location. This may comprise the content controller 204 configuring the content which is to be displayed by each gaming display based upon the properties of the individual display and based upon the relative positions of the displays and their characteristics, so that the content is properly display by each individual display, but is also synchronized between the displays.

Figure 9:
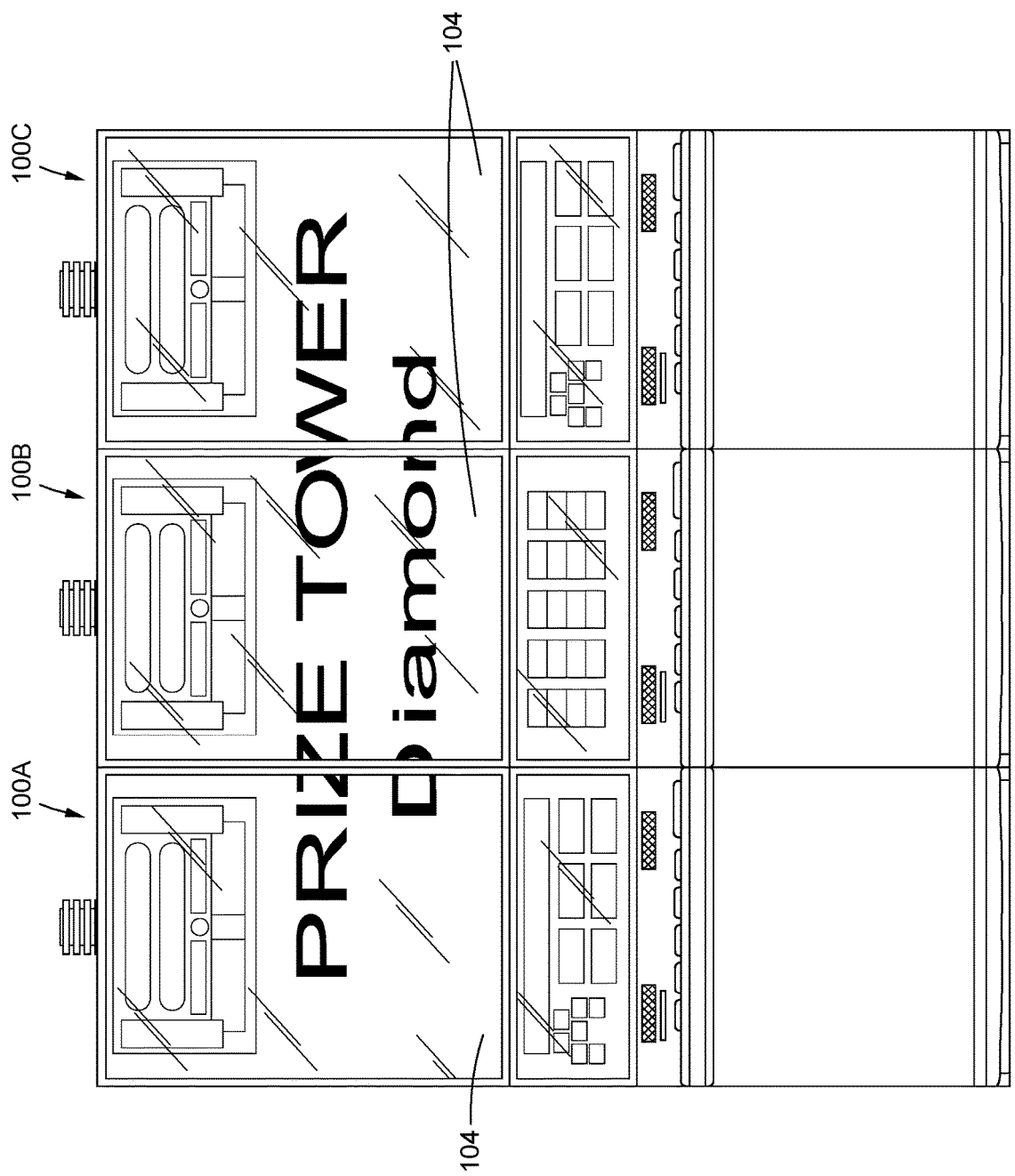
FIG. 9 illustrates another example of the display of content by a plurality of gaming machines in accordance with an example of the invention.

As described in more detail below, content may be synchronized between gaming displays in time and/or space. Synchronization in space: here the gaming displays cooperatively display portions of common content. To do this, each gaming display (EGM display or external display) is aware of its position relative to the other devices. In one example, the same software and content are installed or provided to each EGM or display controller. Each gaming display (the EGM or controller thereof) displays only a portion of the content, based upon the position thereof relative to the other gaming displays, such as by cropping the content to size of the display it is being presented on, based upon the position of the particular gaming display to the other gaming displays. Each corresponding display performs the same function. Both physical dimensions of each gaming display and gaps or distance between the gaming displays (corresponding EGMs and/or external displays) are accounted and factored for synchronization. FIG. 9 illustrates one such example, which is described in more detail below.

Synchronization in time: here the gaming displays are configured to cooperatively display content that changes (such as by moving) over time. Again, each gaming display is aware of its relative position the other gaming displays. If content is configured to move, each gaming display (EGM or associated external display controller) is provided with common content and instructions, thereby allowing each gaming display to display the content at the correct time, in relation to the location of the display.

Of course, some content may be configured to be displayed by multiple gaming displays and the location of the content may change, whereby synchronization of the content must occur in both space and time.

In step S606, once the designated displays are configured, the configuration may be saved and implemented, such as by placing the configuration in a "display" mode. In this mode, the content is displayed based upon the configuration. In one example, once initiated, the gaming displays may display the designated content on a looping/continual basis (until interrupted/stopped, such as described below).

In some examples, content which is displayed on the gaming displays may include static information or content (e.g. content which does not change over time), but may include dynamic content. For example, the content controller 204 may cause an external gaming display 110 at a bank of EGMs 100 to display a progressive jackpot content package. This content may include fields for actual jackpot values which vary over time. As indicated, the content controller 204 may communicate with a progressive controller 200 to obtain real time or near real time jackpot values and associate those values with the content (or provide them to the displays) for display.

This example may have other features and configurations. For example, while the display of content may be controlled or triggered by the content controller 204, in certain examples, an associated EGM may cause the external gaming displays 110 to display content. This content may be provided by the EGM, or might be provided from an external source, upon the EGM indicating a trigger for display of the content. As one example, a particular event or outcome in a game at one of the EGMs may cause the control controller 204 to display the "event driven" or "dynamic" content at the other EGMs 100 and/or the external gaming displays 110. In some examples, an EGM 100 might simply report a triggering event to the content controller 204, causing the content controller 204 to cause the event driven content to be displayed.

Display/Synchronization of Content Across Multiple EGMs

As another example of the invention, content is synchronously displayed across multiple gaming displays, such as the displays of two or more EGMs. As detailed above, such content may be synchronized, in time, space, or both. In such a configuration, portions of content may be displayed by different ones of the displays (spatial synchronization). As one example, the content may comprise an ocean scene having moving objects, such as fish. Different portions of the ocean scene may be displayed by different ones of the displays, whereby two or more displays create a unified image of the entire ocean scene. In this example, the content may be synchronized to not only create a unified static image (spatial synchronization), but of moving images or effects (time synchronization). For example, a fish swimming from one portion of the scene to another will appear to move seamlessly from one display to another. Moreover, the content is displayed to address issues such as the space between the displays. For example, a moving object's point of exit on the first display and the moving object's point of entry on the second display are configured to preserve visual continuity when considering the location of the displays (and thus the relative time of travel of the object between them, the direction of travel, etc.). In other examples, where the sizes of the displays vary significantly from another, the speed of moving objects may be adjusted to create common time of display of the object (e.g. to travel at a slower speed on a smaller monitor, to ensure each monitor displays the moving object for the same amount of time).

In one example, content may be presented synchronously across the displays of two or more EGMs 100 using the content controller 204, in a similar manner to that described above. However, in another example, EGMs 100 are linked in a manner in which one EGM 100 comprises a director (or master or host), and the other EGMs 100 comprise actors which are controlled or act based upon the director. In this configuration, the director EGM 100 controls the presentation of the content, synchronizing the content across the multiple EGMs.

While linked or connected EGMs might be selected in a manner similar to that described above, such as based upon user input (including input regarding relative positions of the EGMs as linked to EGM IDs, number of displays associated with the EGMs, etc.), in one example, the EGMs and properties thereof, such as their physical position (and thus the physical position of the displays of the EGMs) is automated or auto-detected. As one example, a plurality of EGMs 100 may be linked (such as by software running on an associated content controller 204 or by software running on the EGMs). The EGMs 100 may be identified by a machine ID and might be associated with one another in a setup mode. One or more proximity algorithms, cameras, sensors or the like may be used to detect the positions of the associated EGMs. For example, proximity may be determined using an IPS (indoor positioning system) which includes a plurality of location sensors or beacons and associated software which calculates the locations of the devices relative to one another; where signal triangulation or the like may be used, or GPS or other systems may be used). Information about each EGM 100 (such as from a lookup table or from the EGM itself) may be used to determine properties of the EGM, such as the size of the EGM, size/location or other properties of the displays associated therewith, etc.). Thus, as one example, two EGMs may be arranged side-by-side in a bank. The EGMs 100 may be the same (have the size and shape and display configuration), whereby the content configurator (running on the content controller 204 or the EGM or remotely) can then determine (from information about the EGMs and associated displays), the configuration of the content, such as to cause the content to be split between the displays of the two EGMs with consideration of the spacing between the corresponding edges of the displays thereof.

The configured content might be displayed at various times, such as upon a start time, a designated time, at a particular event or the like. Further, a determination may be made on which EGMs (or displays of the EGMS) are to display the content. For example, certain activities may only require a local display of a sign package (such as all gaming displays in one bank or cluster, or all gaming displays in an area of a casino, etc.), while other activities may trigger a special content displayed on all EGMs in a casino.

In certain examples, the content is provided to the EGMs as a package, such as a sign package which is downloaded to each designated EGM. The sign package may be customized. In one example, the content, such as a sign package, may comprise audio files, which may further be customized to produce positional audio. For example, where a special content requires a moving object travelling from a first gaming display to a second gaming display, the moving object may be accompanied by audio, which may also travel from the audio device of the first gaming display to the audio device of the second gaming display.

One example of the invention is a system and method to display content driven by an EGM to play on an external gaming display using an external controller. In this example, the content may be static or dynamic, and both separate sign packages (e.g. sign packages which are separate from game content) or game-integrated sign packages (e.g. where the sign content is tied to or associated with a game or game information) may be supported. A content controller or an EGM may trigger the content on both the EGM and the external gaming display or just the external gaming display.

Yet another example of the invention is a system and method to synchronize audio and visual output on connected EGMs, where the sign packages may be static or dynamic. It is contemplated that the dynamic content may be determined by predetermined events such as game outcomes, community bonuses, etc.

As indicated above, in one example, one EGM acts as the director (or master or host) which controls (including synchronizes) the presentation of content relative to itself and other EGMs which comprise actors (where the director may transmit to the actors and listens for responses or actors looking for a director, and where the actors send messages to locate a director; in one configuration, an EGM which is looking to enter or join a network transmits network discovery data which includes information about the EGM for use in determining whether the EGM should be permitted to join, such as a Bank ID number, Game Family ID number of the like—where the Bank ID and Game Family ID need to match in order for the EGM to join other EGMs). In one example, an EGM may be designated as the director and that status may be migrated to another EGM, such as based upon a planned migration or an unplanned migration. Planned migration is when an EGM knows that it may be shutting down or at some point in the future it may not be the best machine to be the director. At this point, the EGM may choose one of the actor EGMS (such as the one it has received the most recent message from), and send out a message to all of its actors/clients to migrate to that actor as the new director. Unplanned migration occurs when actors can no longer maintain connection with their director. In that event, actors may be configured to search for a new director. If a director is not found, then one of the actors may arbitrarily elevate itself to director status. All other actors should then see that director while they're searching for a new one and connect to it. Other types of synchronization between director and actor gaming displays may include but are not limited to time, video, and audio data.

As indicated, in on example, if the designated director EGM fails, one of the actors is selected as the director relative to the remaining actor EGMs. As indicated, the identification of a director may be configured to be automatic and/or fail-safe. This configuration may involve an analysis of the specifics of the EGM and/or external display device, such as preferring cable-powered devices over battery-operated devices, preferring devices connected to ethernet cables over devices connected via wi-fi, etc. Further, where a previously identified director EGM fails to function properly (for example, if the director EGM is taken offline for maintenance, or transmits an error to the synchronization system S), then another EGM may be identified as the new director EGM (one of the actors becomes the director, and if the previous director comes back online, it becomes an actor to the newly designated director).

Additional aspects of the invention will be appreciated from examples thereof.

Figure 8A:
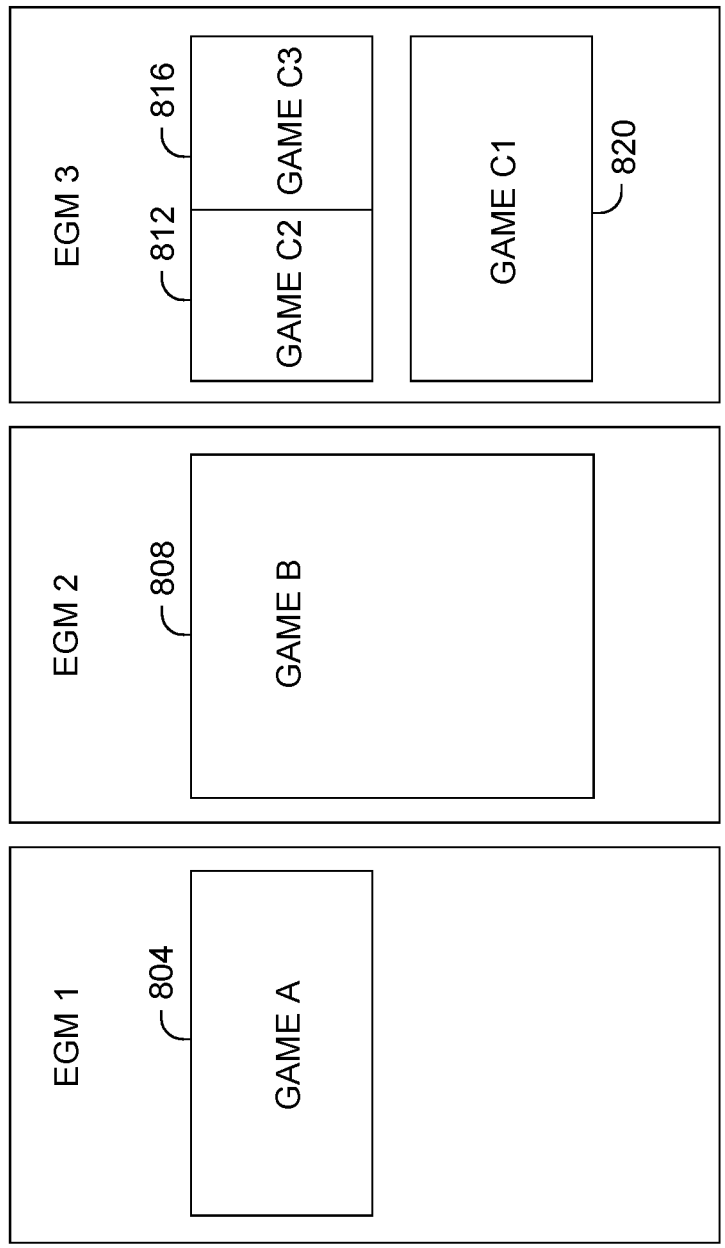
FIGS. 8A-8E illustrate examples of the display of content by a plurality of gaming machines in accordance with examples of the invention.

FIG. 8A illustrates an exemplary group or cluster of gaming displays. In this example, the displays are all associated with EGMs, where a first EGM may comprise a first display device 804, the second EGM may comprise a second display device 408 (which may be a second screen size than the display of the first EGM), and the third EGM may comprise a third display device 812, a fourth display device 816, and a fifth display device 820. As illustrated, the display devices 804-820 may have different effective display areas, and may be in different locations, including at different heights relative to one another. In addition, the display devices 804-820 may also have other differing display properties, such as differing display resolutions, frame rates, etc.). The content normally displayed on the display devices 804-820 may be content related to wagering games presented by the respective EGM, and may be different from each other, such as content relating to Game A, Game B and Game C (where the content related to Game C may have different aspects or portions).

Figure 8B:
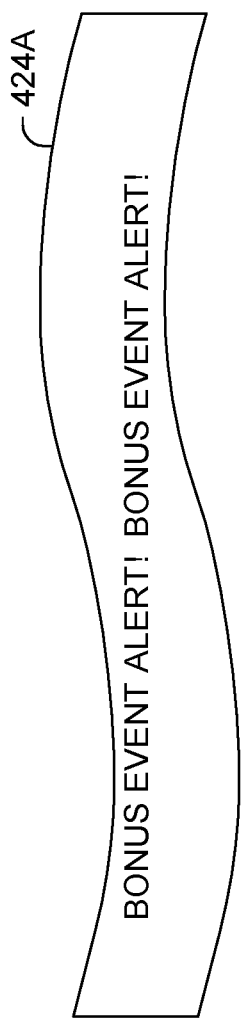

FIG. 8B illustrates an exemplary special content transmitted to the gaming displays in FIG. 8A, which may be a line of text over a banner 824A. The text may be repeated to fill the banner.

Figure 8C:
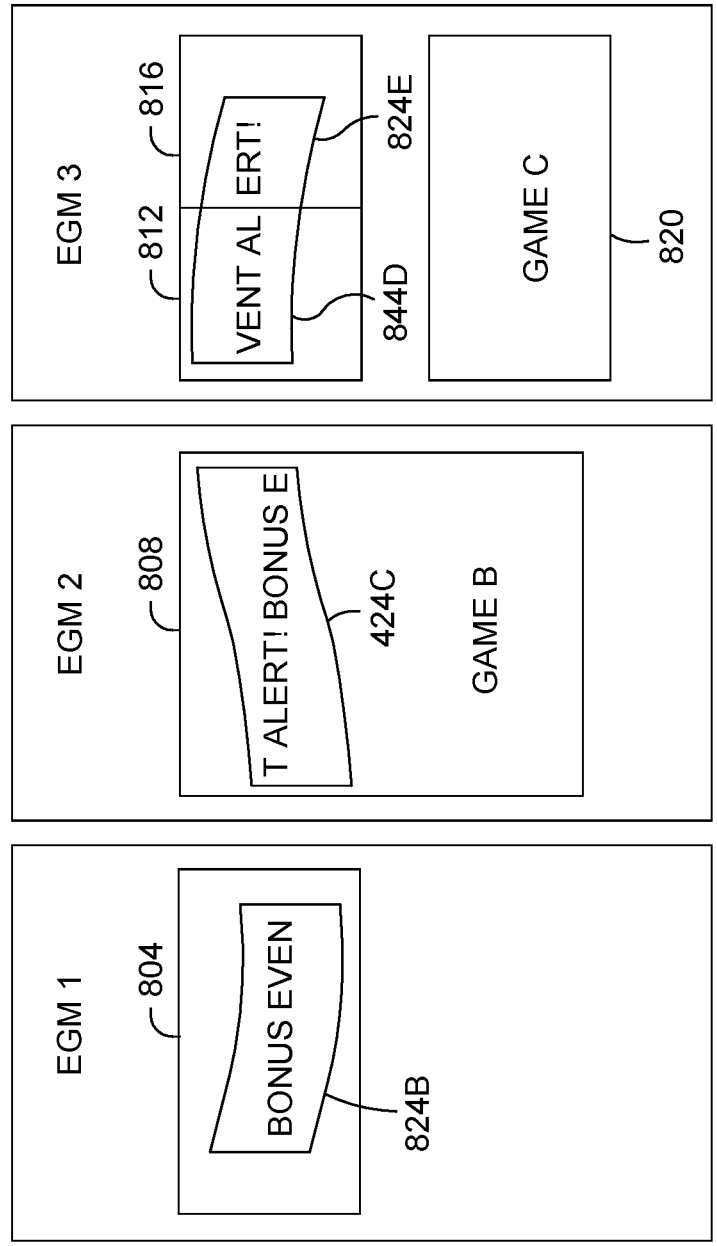

FIG. 8C illustrates a first example of how the special content in FIG. 8B may be displayed in a synchronized manner on the gaming displays illustrated in FIG. 8A. As illustrated in FIG. 8C, the special content in FIG. 8B may be separated into four portions 824B-E, and displayed across four display devices 804-816. In this example, the first EGM 1 may be designated as a director, such that the remaining portions of the special content 824C-E may be displayed at the same height as the first portion of the special content 824B. This configuration of the display may involve displaying the second portion of the special content 824C on the upper portion of the display device 808, or utilizing the upper display devices 812, 816. The remaining portion of a larger display device 808, or the display devices not utilized in displaying the special content 820, may continue to display content unique to their respective EGM and/or gameplay.

Figure 8D:
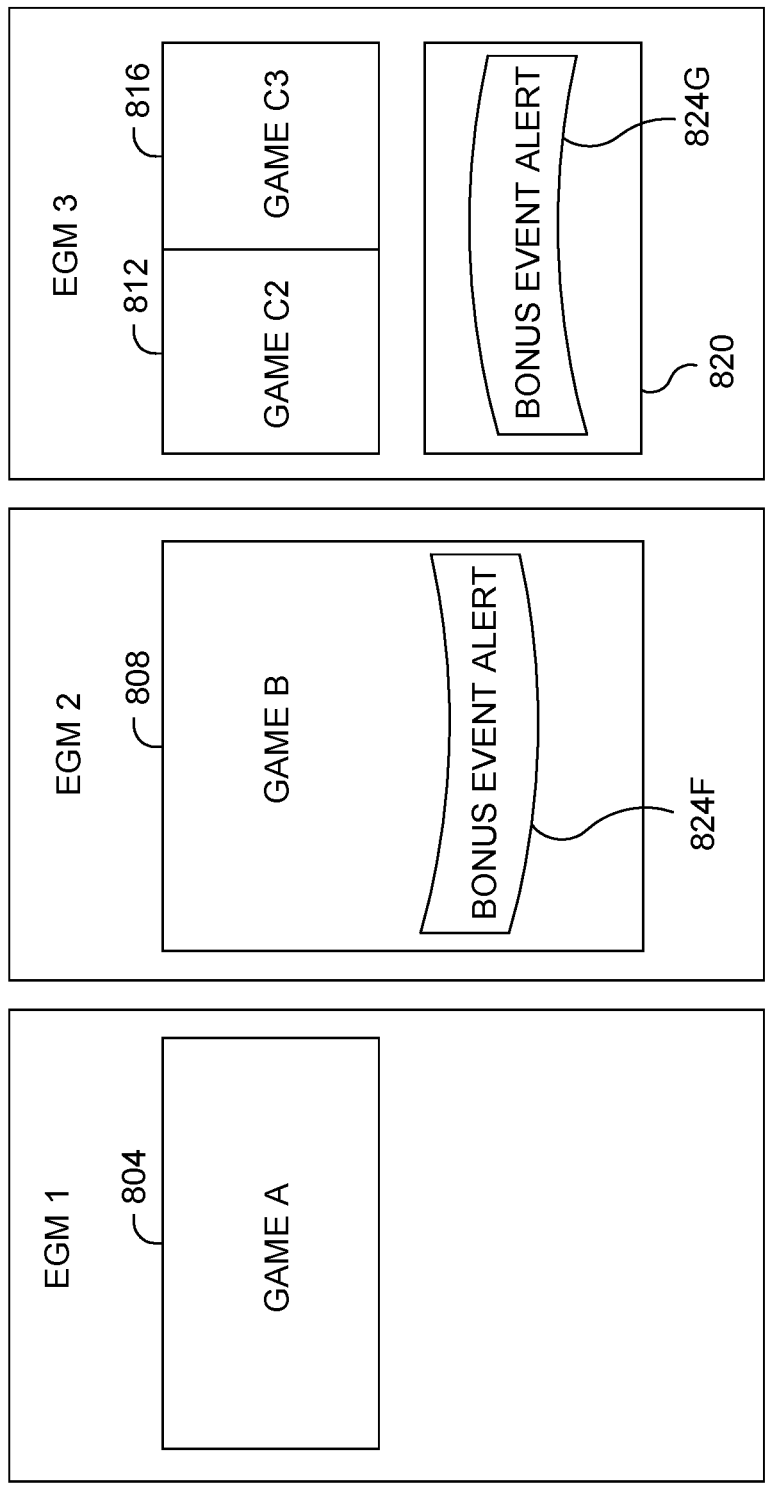

FIG. 8D illustrates a second example of how the special content in FIG. 8B may be displayed in a synchronized manner on the gaming displays illustrated in FIG. 8A. In this example, EGM 3 may be designated as a director, such that the special content may be displayed on two display devices 808 and 820. To synchronize the special content to the director display device, the bottom portion of the second display device 808 may be utilized. To accommodate the smaller span (displaying the special content 824F, 824G across two display devices in FIG. 8D, compared to three display devices in FIG. 4C), the banner may be made shorter, and the text may be reduced in font size. The upper portion of the second display device 808 and the remaining display devices 804, 812, 816 may continue to display content unique to their respective EGM and/or gameplay.

Figure 8E:
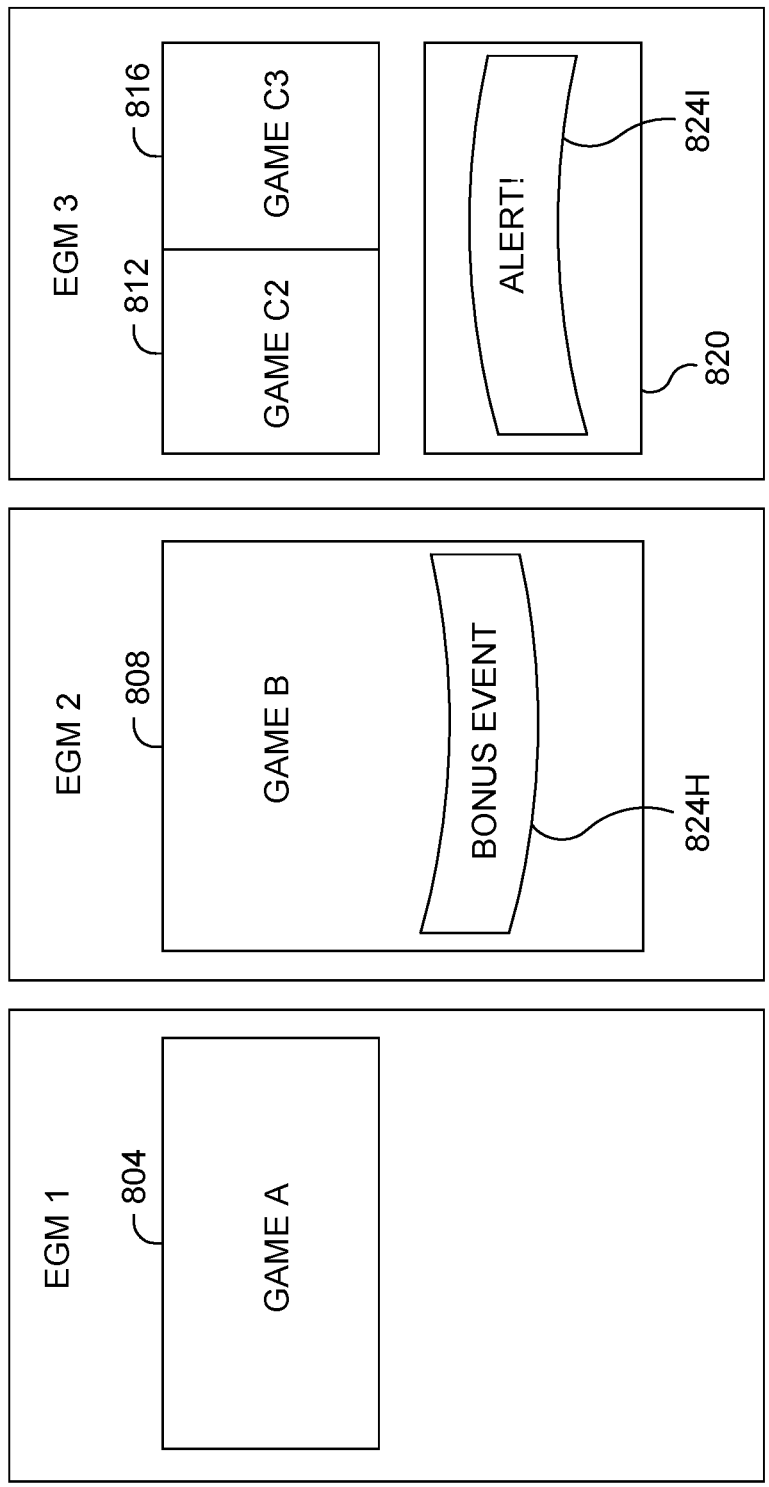

FIG. 8E illustrates a third example of how the special content in FIG. 8B may be displayed in a synchronized manner on the gaming displays illustrated in FIG. 8A. To accommodate the smaller span (displaying the special content 824H, 824I across two display devices in FIG. 8E, compared to three display devices in FIG. 4C), the banner may be made shorter. Rather than reducing the font size of the text, however, alternative text may be used (or repetition of text may be eliminated to display a shorter message).

Another example of the invention is illustrated in FIG. 9. FIG. 9 illustrates how the content controller 204 may be configured to display content across the displays of multiple EGMs (three EGMs 100A, 100B, 100C in this case). The content comprises a single image where portions of the image are displayed by the displays of the EGMs, and where the content has been configured (automatically) for synchronous display by the displays, including based upon the properties of the displays and their location.

In one example, the sign packages may be content-driven and/or dynamically generated. Content-driven may include storing already-generated sign packages in the database, such that a pre-determined activity/event may trigger the retrieval of the stored sign package. On the other hand, dynamic generation of new sign packages may comprise automatically combining existing sign packages or portions of existing sign packages to generate new sign packages, which may be more customized to a pre-determined activity/event. For example, a jackpot win of $5,000 may cause a sign package to be generated by combining a first set of text (which may be dynamically generated based on jackpot amount, player name, number of games played, etc.), video, and audio files, and displayed on select cluster of gaming displays, whereas a jackpot win of $50,000 may cause a sign package to be generated with a second set of text, video, and audio files (which may be different from the first set), and be displayed on all connected gaming displays. Further, special content may be dynamically generated or customized based on different games played, themes (such as casino themes, which may be updated), or specific events.

In another example, special content may comprise dynamic streaming of videos, which may be generated for specific gaming displays or clusters. For example, a synchronized video streams may include the local display of a time lapse of games played in the past hour on an EGM, for customized output on the display device of that EGM or a video capture of players winning big hits on a cluster of EGM, for synchronized output on that cluster of gaming displays.

Load Balancing

In one example, graphic and/or audio processing may be performed locally (at the director EGM or at each EGM, such as via a video and/or audio controller thereof), by a separate content controller 204, or by a remote device or system, such as a remote content server.

In this regard, a load balancer may be used to aid in monitoring content processing and moving or transferring processing loads from high load environments (EGMs or content controllers) to low load environments (EGMs, content controllers or separate content processors). The load balancer may comprise a computing device comprising a processor, a memory and a communication interface which is configured to receive information from the EGMs (or content controllers), such as regarding their content processing loads, and generate and transmit instructions to the EGMs (or content controllers) to change the location of content processing.

As one example, as indicated above, each EGM may have content available locally for processing and rendering. One EGM in a group may be overclocked and processor strained (e.g. demanded content load exceeds processing capability to provide the content timely) due to heavy content processing for content presentation, such as due to a game state being in a bonus mode. At the same time, another EGM could be either idle, or displaying simple content. A load balancer may be utilized to identify heavy processor loads at the EGMs and offload some of the processing of renders to another machine with a low processor load. Then processed content from low load EGM may be streamed to the high load EGM. An example could be of displaying compressed videos, where significant processing is involved in decompressing the video. This step can be offloaded to another EGM that is idle on the network, and the processed content may be streamed to the EGM that requires the content for display. As one example, a load balance may receive the following information from four different gaming machines: 1) Machine A: content processing overload; 2) Machine B: idle mode (low content processing level); 3) Machine C: idle mode (low processing level); and 4) Machine D: busy (high content processing load, but not overloaded). In response to this information, the load balancer may send instructions to Machines A and B to cause Machine B to process content for use by Machine A and to transmit the processed content to Machine A for use by Machine A. This process may be performed continuously and in real-time due to the constant changes in machine content processing loads.

It is noted that while a load balancer may be used relative to a set of EGMs at a casino, or across a casino, it does not need to be limited to single casino site. For example, load balancing could be handled via cloud-based balancer relative to EGMs across various casino sites. In such a configuration, information from multiple gaming machines at a casino may be transmitted, such as through a centralized hub or terminal, to one or more cloud-based load balancers which effectively operate in the manner described above.

Further, it is possible for the load balancers to cooperate with or implement content processors (local or cloud-based), whereby the load balancer may also be utilized for distributed graphical processing.

In one example, a corrective algorithm may be used to further synchronize image, video, and/or audio positions. Such an algorithm may be implemented at the EGMs, content controllers or via other devices (such as associated with the load balancers), such as to detect when content is no longer synced between gaming displays and implement action to correct, such as re-sync the content. As examples, a director EGM may determine that content at two actor EGMs is no longer synced. The director EGM might determine the content offset (in time) between the two actor EGMs and send a delay instruction to the "ahead" actor EGM which implements a delay equal to the time offset, thus re-syncing the content between the two actor EGMs. As another example, the director EGM might, upon detecting content out of sync, send a clock reset signal to the actor EGMs which causes the EGMs to start a segment of content at the reset time, thus causing the actor EGMs to resync the displayed content.

Gaming Machine Banks as EGMs and Related EGM Outcomes

It is also contemplated that the system, such as the remote server 280, may be integrated with one or more casino systems and/or EGMs 100 to provide additional controls over the EGMs, which may be game-play related. For example, upon automatically identifying all connected EGMs of a particular bank (or other group), the system may be tasked with synchronizing RNGs or outcomes, and awards of connected EGMs based on proximity, game-type, etc. That way, games played on EGMs may be customized based on other connected EGMs. In one example, synchronization of game play may be based on game play factors on a director EGM. For example, if a large award is generated on a director EGM, other connected EGMs in the same cluster may receive an additional chance for awards, and a related sign package may be transmitted for display on that cluster.

As one example, a director EGM of a bank of EGMs may be used to determine (such as by the RNG thereof), the outcome of each game played at the gaming machines of the bank (including the actor EGMs). In one configuration, when actor EGMs link to the director, the director EGM may obtain information regarding the RNGs, game paytables, etc. for each actor EGM. The director EGM may the determine how the actor EGMs are synchronized (or not) relative to the presentation of outcomes of games, including whether the RNG of the director or an actor EGM is used to determine the outcome, how the EGMs of the bank synchronize when a certain outcome is determined on a request from one singular EGM on the bank, whether certain outcomes at the director or actor EGMS are distributed to the other EGMs (such as when a large award at one EGM is to be shared to the other EGMs, etc.)

It will be understood that the above described arrangements of apparatus and the method there from are merely illustrative of applications of the principles of this invention and many other examples and modifications may be made without departing from the spirit and scope of the invention as defined in the claims.

What is claimed is:

1. A method for generating and displaying synchronized gaming-related content in a gaming environment which includes a plurality of gaming machines and a plurality of gaming displays, comprising:

detecting, by a content synchronization controller which is separate from a gaming machine controller of the at least one gaming machine and which comprises a memory, a processor and machine-readable code stored in said memory and executable by said processor, said plurality of gaming displays of said gaming environment;

receiving, at said content synchronization controller, user input of a selection of at least a first gaming display of said plurality of gaming displays and a second gaming display of said plurality of gaming displays;

determining, at said content synchronization controller, a first set of video display properties of said selected first gaming display of said plurality of gaming displays and a second set of video display properties of said selected a second gaming display of said plurality of gaming displays;

receiving, at said content synchronization controller, information regarding a location and orientation of said first and second gaming displays;

determining, at said content synchronization controller, using said location and orientation information, a physical spatial relationship of said first and second gaming displays;

receiving, at said content synchronization controller, input from said user of at least one stored gaming information content package;

generating, by said content synchronization controller, a first content configuration for said at least one gaming information content package for said first gaming display based at least in part upon said first set of video display properties thereof and said physical spatial relationship of said first and second gaming displays, and a second content configuration for said at least one gaming information content package for said second gaming display based at least in part upon said second set of video display properties thereof and said physical spatial relationship of said first and second gaming displays; and causing, at a designated time, said first gaming display to present first video content based upon said first content configuration and said second video display to present second gaming content based upon said second content configuration, said first video content and said second video content synchronized in at least one of time and space.

2. The method in accordance with claim 1, wherein said step of causing said first gaming display to present first video content based upon said first content configuration and said second video display to present second gaming content based upon said second content configuration comprises processing said first video content and said second video content, wherein a first processor is associated with said first gaming display and a second processor is associated with said second gaming display, and comprising the steps of balancing a load of said processing of said first and second video content between said processors associated with said first and second gaming displays.

3. The method in accordance with claim 2, wherein said processor associated with said first gaming display comprises a processor of a first gaming machine of said plurality of gaming machines and said processor associated with said second gaming display comprises a processor of a second gaming machine of said plurality of gaming machines.

4. The method in accordance with claim 3, further comprising the step of receiving, from said processors of said first and second gaming machines, a current processing load of each of said processors of said first and second gaming machines and balancing said load of said processing of said first and second video content based upon said current processing load of each of said processors of said first and second gaming machines.

5. The method in accordance with claim 1, wherein said step of determining said physical spatial relationship of said first and second gaming displays comprises auto-detecting, by said content synchronization controller, information regarding a physical location of said first and second gaming displays.

6. The method in accordance with claim 5, wherein said information regarding a location is obtained from one or more sensors in response to a query from said content synchronization controller.

7. The method in accordance with claim 1, wherein said step of determining said first set of video display properties and said second set of video display properties comprises receiving, at said content synchronization controller, a first ID associated with said first gaming display and a second ID associated with said second gaming display, and obtaining said first set of video display properties from a data table using said first ID and obtaining said second set of video display properties from said data table using said second ID.

8. The method in accordance with claim 1, wherein said designated time comprises the occurrence of a predetermined event, and further comprising the step of receiving, at said content synchronization controller from a progressive controller which is separate from said plurality of gaming machines and said content synchronization controller and which is in communication with said plurality of gaming machines, notification of the occurrence of a predetermined event.

9. The method in accordance with claim 8 wherein said notification of the occurrence of a predetermined event predetermined event comprises notification from said progressive controller of the winning of a jackpot associated with said progressive controller.

10. The method in accordance with claim 1, wherein said step of determining said physical spatial relationship of said first and second gaming displays comprises receiving user input to said content synchronization controller, said input comprising movement of a displayed graphical representation of said second gaming display to a location relative to said displayed graphical representation of said first gaming display on a user display device which matches the physical locations of the first and second gaming displays relative to one another.

11. The method in accordance with claim 1, wherein said plurality of gaming displays comprise at least one gaming machine display and at least one display external to said plurality of gaming machines.

12. The method in accordance with claim 1, wherein said content synchronization controller generates a list of available content packages from a set of content packages for use with said plurality of gaming displays, where said list comprises one or more of said content packages from said set which are applicable to said selected first and second gaming displays, and wherein said user input of said at least one stored gaming information content package comprises a user input of at least one of said available content packages from said list.

13. A system for generating and displaying synchronized gaming-related content in a gaming environment which includes a plurality of gaming machines and a plurality of gaming displays, comprising:

a content synchronization controller which is separate from a controller of each of the plurality of gaming machines and which comprises a memory, a processor and machine-readable code stored in said memory and executable by said processor;

a progressive controller which is separate from the controllers of each of the plurality of gaming machines and the content synchronization controller and which is communicatively coupled to said gaming machines and said content synchronization controller;

a content server which is separate from the content synchronization controller and the progressive controller and comprises a content server processor and a database storing a plurality of content packages;

said machine-readable code of said content synchronization controller configured to cause said processor thereof to detect, via one or more communication links, said plurality of gaming displays;

said machine-readable code of said content synchronization controller configured to cause said processor thereof to receive user input of a selection of at least a first gaming display of said plurality of gaming displays and a second gaming display of said plurality of gaming displays;

said machine-readable code of said content synchronization controller configured to cause said processor thereof to determine a first set of video display properties of said selected first gaming display of said plurality of gaming displays and a second set of video display properties of said selected a second gaming display of said plurality of gaming displays;

said machine-readable code of said content synchronization server configured to cause said processor thereof to receive information regarding a location and orientation of said first and second gaming displays;

said machine-readable code of said content synchronization server configured to cause said processor thereof to determine, using said location and orientation information, a physical spatial relationship of said first and second gaming displays;

said machine-readable code of said content synchronization server configured to cause said processor thereof to receive input from said user of a selection of at least one of said content packages stored by said content server;

said machine-readable code of said content synchronization server configured to cause said processor thereof to generate a first content configuration for said at least one gaming information content package for said first gaming display based at least in part upon said first set of video display properties thereof and said physical spatial relationship of said first and second gaming displays, and a second content configuration for said at least one gaming information content package for said second gaming display based at least in part upon said second set of video display properties thereof and said physical spatial relationship of said first and second gaming displays; and said machine-readable code of said content synchronization server configured to cause said processor thereof to cause, at a designated time, said first gaming display to present first video content based upon said first content configuration and said second video display to present second gaming content based upon said second content configuration, said first video content and said second video content synchronized in at least one of time and space.

14. The system in accordance with claim 13, wherein said content synchronization controller implements a load balancer, wherein a first processor is associated with said first gaming display and a second processor is associated with said second gaming display, and said load balancer is configure to balancing a load of said processing of said first and second video content between said processors associated with said first and second gaming displays.

15. The system in accordance with claim 14, wherein said processor associated with said first gaming display comprises a processor of a first gaming machine of said plurality of gaming machines and said processor associated with said second gaming display comprises a processor of a second gaming machine of said plurality of gaming machines.

16. The system in accordance with claim 14, wherein said load balancer receives, from said processors of said first and second gaming machines, a current processing load of each of said processors of said first and second gaming machines and balances said load of said processing of said first and second video content based upon said current processing load of each of said processors of said first and second gaming machines.

17. The system in accordance with claim 13, wherein said content synchronization controller determines said physical spatial relationship of said first and second gaming displays by auto-detecting information regarding a location of said first and second gaming displays.

18. The system in accordance with claim 17, further comprising one or more sensors which output said location information to said content synchronization controller.

19. The system in accordance with claim 13, wherein said designated time comprises the occurrence of a jackpot event, wherein said progressive controller generates and transmits a jackpot event notification to said content synchronization controller.

20. The system in accordance with claim 13, wherein said content synchronization controller generates a list of available content packages from said content packages stored by said content server, where said list comprises one or more of said content packages stored by said content server which are applicable to said selected first and second gaming displays, and wherein said user input of said at least one content package stored by said content server comprises user input of at least one of said available content packages from said list.

* * * * *